June 13, 1961  G. D. STOUGH  2,988,020
CARGO BRACING STRUCTURE
Filed April 10, 1959  4 Sheets-Sheet 1
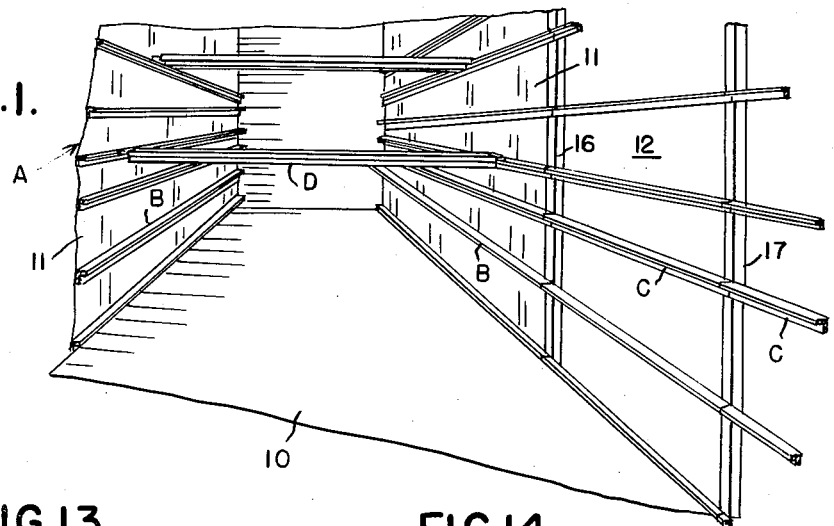
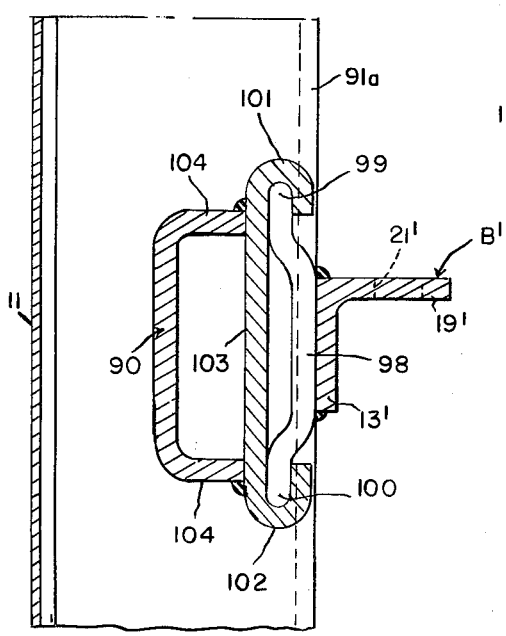
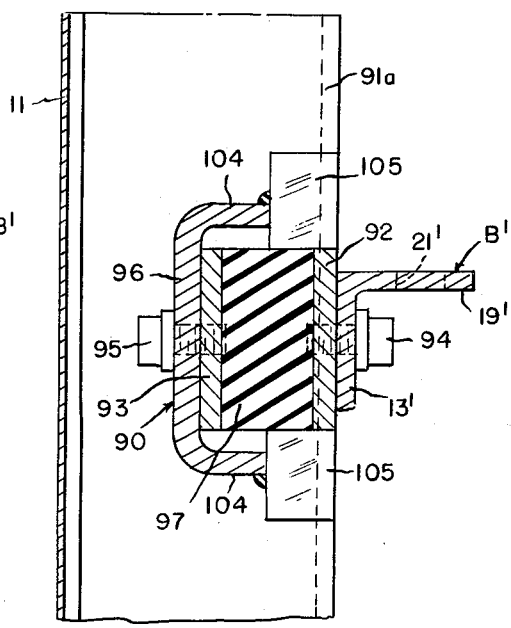
INVENTOR.
GERALD D. STOUGH
BY
Whittemore, Hulbert & Belknap
ATTORNEYS

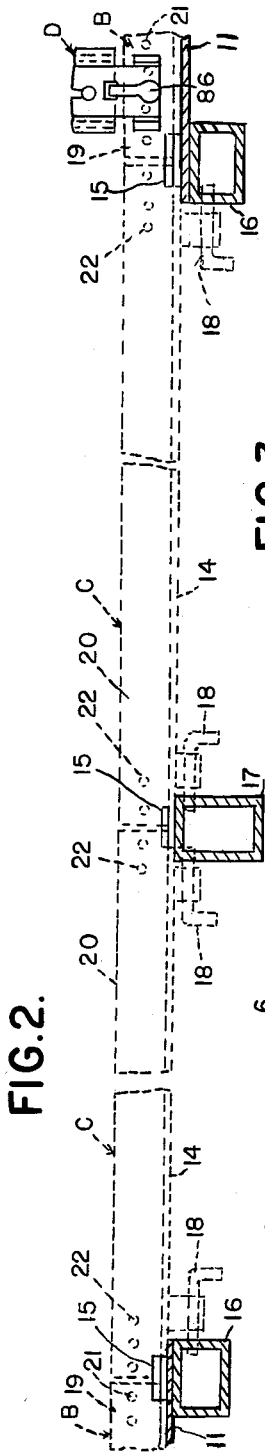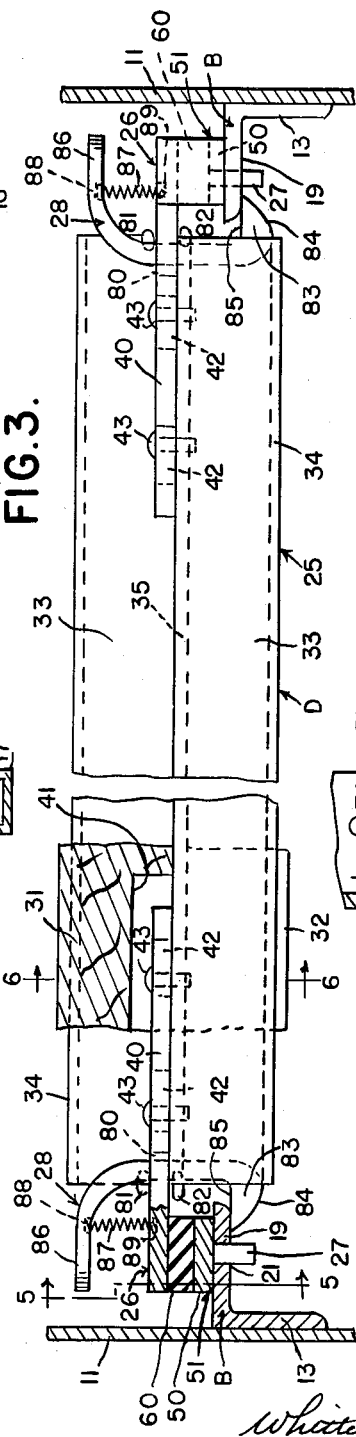

June 13, 1961  G. D. STOUGH  2,988,020
CARGO BRACING STRUCTURE
Filed April 10, 1959  4 Sheets-Sheet 3
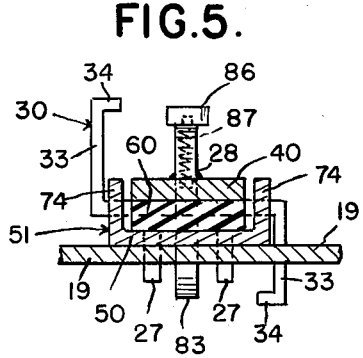
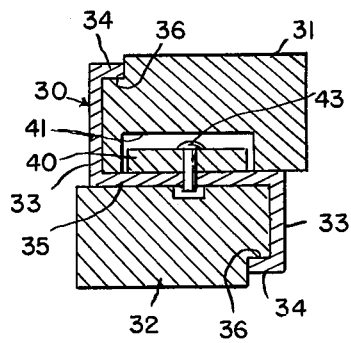
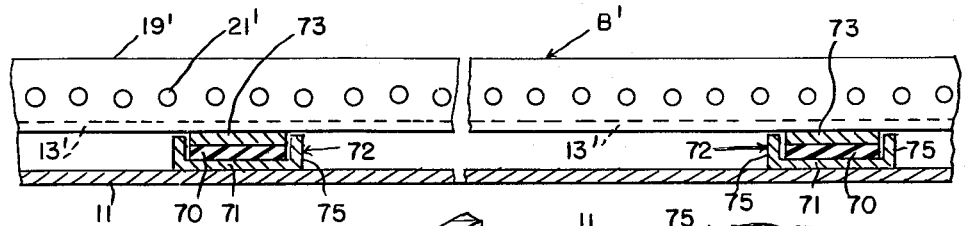
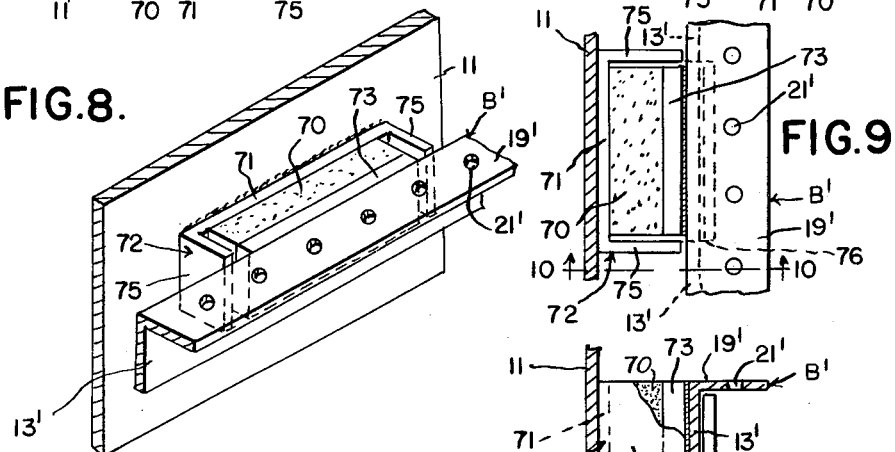
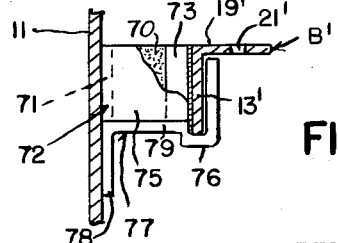
INVENTOR.
GERALD D. STOUGH
BY
Whittemore, Hulbert & Belknap
ATTORNEYS

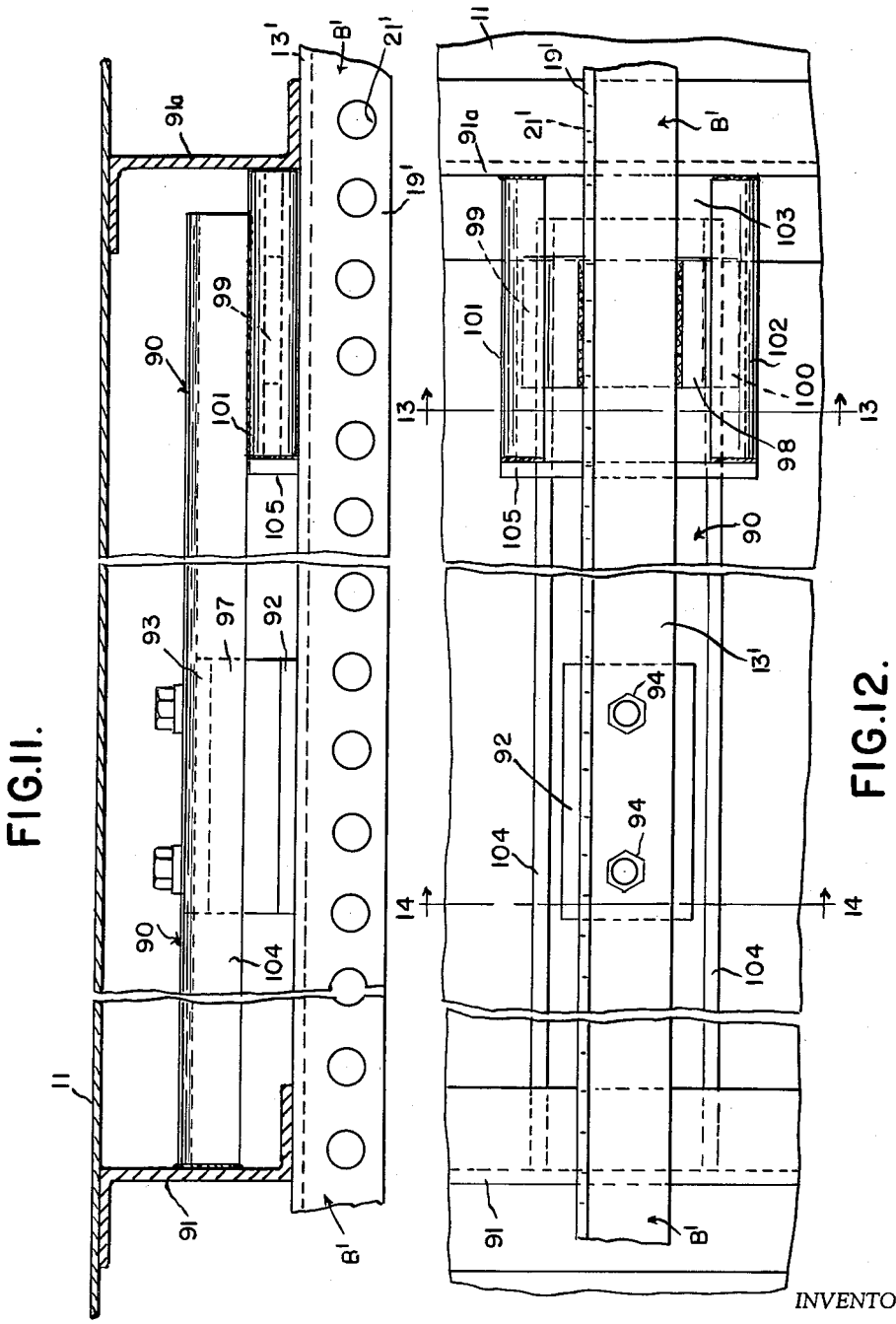

United States Patent Office 2,988,020
Patented June 13, 1961

2,988,020
CARGO BRACING STRUCTURE
Gerald D. Stough, Detroit, Mich., assignor to Whitehead & Kales Company, River Rouge, Mich., a corporation of Michigan
Filed Apr. 10, 1959, Ser. No. 805,541
5 Claims. (Cl. 105—369)

This invention relates generally to cargo bracing structure for use within the longitudinally extending storage chamber of a transport vehicle, such as a railway boxcar or an enclosed cargo carrying trailer, and is a continuation-in-part of the subject matter of my application filed November 4, 1957, bearing Serial No. 694,223.

One of the essential objects of the invention is to provide a cargo bracing structure having means for cushioning and yieldingly resisting movement of the cargo lengthwise of the storage chamber when the transport vehicle is subjected to a shock load while in transit or while being coupled to a stationary vehicle.

Another object is to provide a cargo bracing structure wherein the resisting means includes flexible connections between means fixed to the upright side walls of the storage chamber and to longitudinally movable horizontally extending anchorage rails for the cargo bracing crossbars, for absorbing shocks and jars to which the cargo braced by said crossbars is subjected when it tends to move lengthwise of the storage chamber.

Another object is to provide a cargo bracing structure wherein the flexible connections include yieldable shock absorbing elements between and fixed to longitudinally movable horizontally extending anchorage rails for the crossbars and to horizontally extending supporting rails disposed substantially parallel to said anchorage rails and fixed to portions of the upright side walls of the storage chamber.

Another object is to provide a cargo bracing structure having slideways fixed to the horizontally extending supporting rails and having means fixed to said longitudinally movable anchorage rails and slidably engaging said slideways for guiding the anchorage rails and crossbars carried thereby during longitudinal movement thereof.

Another object is to provide a cargo bracing structure wherein the slideways and slidable means aforesaid are inter-engaged in such a way that the anchorage rails are effectively held against both vertical and lateral movements while moving lengthwise of said side walls.

Another object is to provide a cargo bracing structure having means fixed to one of said inter-engaged guide means for limiting the longitudinal movement of the anchorage rails, so that said anchorage rails will be prevented from accidentally moving beyond predetermined limits in the event the yieldable shock absorbing elements should rupture or break loose.

Another object is to provide a cargo bracing structure that is simple in construction, economical to manufacture, easy to install, and efficient in operation.

Other objects, advantages and novel details of construction of this invention will be made more apparent as this description proceeds, especially when considered in connection with the accompanying drawings, wherein:

FIGURE 1 is a fragmentary perspective view of the interior of a longitudinally extending storage chamber of a transport vehicle, such as a railway boxcar or an enclosed cargo carrying trailer, and showing such interior, as well as a doorway of the storage chamber, equipped with cargo bracing structure embodying my invention.

FIGURE 2 is an enlarged horizontal sectional view through the fixed doorway posts and adjacent side wall portions, and through an intermediate movable post of the storage chamber of the transport vehicle, showing by dotted lines the removable horizontally extending doorway anchorage rails and associated locking means therefor; showing by full lines portions of the stationary horizontally extending anchorage rails secured to the fixed doorway posts in longitudinal alignment with the removable anchorage rails, and showing a portion of a transversely extending crossbar applied to one of the stationary anchorage rails.

FIGURE 3 is an enlarged fragmentary vertical sectional view through the opposed upright side walls of the storage chamber of the transport vehicle, showing horizontally extending stationary anchorage rails fixed to said opposed upright walls, and showing a crossbar embodying my invention, with opposite ends thereof anchored to said stationary rails, with parts broken away and in section.

FIGURE 4 is a fragmentary horizontal sectional view taken through one upright side wall of the storage chamber of the transport vehicle at a point above a horizontally extending stationary anchorage rail, and showing a top plan view of one end portion of the crossbar illustrated in FIGURE 3.

FIGURE 5 is a vertical sectional view taken substantially on the line 5—5 of FIGURE 3.

FIGURE 6 is a vertical sectional view taken substantially on the line 6—6 of FIGURE 3.

FIGURE 7 is a fragmentary horizontal sectional view taken through one upright side wall of the storage chamber of the transport vehicle at a point above a horizontally extending longitudinally movable anchorage rail for a crossbar, and showing flexible connections between said rail and said upright side wall, with parts broken away and in section.

FIGURE 8 is a fragmentary perspective view of one upright side wall of the storage chamber of the transport vehicle and of a horizontally extending longitudinally movable anchorage rail for a crossbar, and showing one of the flexible connections between said rail and said upright side wall.

FIGURE 9 is a fragmentary horizontal sectional view taken through one upright side wall of the storage chamber of the transport vehicle at a point above a horizontally extending longitudinally movable anchorage rail for a crossbar, and showing another modified form of flexible connection between said rail and said side wall.

FIGURE 10 is a fragmentary vertical sectional view taken substantially on the line 10—10 of FIGURE 9.

FIGURE 11 is a fragmentary horizontal sectional view taken through longitudinally spaced fixed posts and through one side wall of a storage chamber of a transport vehicle at a point above a horizontally extending longitudinally movable anchorage rail for a crossbar, and showing another modified form of flexible connection between said rail and said side wall, with parts broken away.

FIGURE 12 is a side elevational view of the structure illustrated in FIGURE 11, with parts broken away.

FIGURE 13 is a vertical sectional view taken substantially on the line 13—13 of FIGURE 12.

FIGURE 14 is a vertical sectional view taken substantially on the line 14—14 of FIGURE 12.

In the drawings, A is a transport vehicle storage chamber having a load-sustaining floor 10 and spaced upright side walls 11 extending upwardly from and rigid with said floor and provided with one or more door openings 12.

B are vertically spaced horizontal anchorage rails of inverted L cross section upon the upright side walls 11 of the storage chamber, and C are vertically spaced horizontal anchorage rails of inverted L cross section bridging the door opening 12 and disposed between and substantially in horizontal alignment with the rails B. In FIGURES 1 to 5 inclusive, the rails B are stationary and have vertical flanges 13 fixed to the side walls 11, while the rails C are removable and have vertical flanges 14 detachably interlocked with upstanding clips 15 fixed to doorway posts 16 and 17 respectively.

Any suitable means such as slidable locking pins 18 may be carried by the removable rails C at opposite ends thereof for engagement with suitable holes or apertures in the posts 16 and 17 to detachably retain the removable rails C in interlocked engagement with the clips 15.

The posts 16 are located at opposite upright side edges of the door opening and are preferably fixed to the floor 10 and side walls 11 of the storage chamber, while the intermediate post 17 may be either shiftably or removably mounted in any suitable manner in the center of the door opening 12.

The horizontal flanges 19 and 20 respectively of the stationary and removable rails B and C are provided with longitudinally spaced vertically extending holes or openings 21 and 22 respectively. Such rails B and C constitute the anchorage means aforesaid upon opposite upright side walls of the storage chamber for the crossbars D.

Each crossbar D has a length substantially equal to the distance between the side walls 11 of the storage chamber and comprises an elongated body portion 25, heads 26 carried by and projecting endwise from said body portion 25 at opposite ends thereof, spaced vertically extending anchorage pins 27 carried by said heads and adapted to be detachably interlocked with the spaced holes 21 and 22 respectively in said rails B and C and pivotally mounted latch elements 28 carried by said heads and operable automatically when the anchorage pins 27 are interlocked with the holes 21 of the rails to engage the undersides of said rails to hold the anchorage pins 27 against accidental displacement.

The body portion 25 of each crossbar comprises a metal rail or beam 30 of substantially S cross section, and two relatively thick strips 31 and 32 respectively of wood or the like. Preferably the oppositely extending lateral flanges 33 of the beam 30 have inturned marginal flanges 34 disposed substantially parallel to the central web 35 of the beam, and the strips 31 and 32 are upon opposite sides of and rigidly secured to the central web 35 of said beam. Such strips 31 and 32 are staggered on the central web 35 and project slightly beyond the lateral flanges 33 of the beam. These strips 31 and 32 also have recesses 36 receiving the marginal flanges 34. Thus the wooden strips 31 and 32 only of the body portion 25 are engageable with the cartons or crates (not shown) when the crossbars are anchored within the storage chamber.

One or both of the heads 26 may be slidable lengthwise of said body portion 25 to facilitate the proper engagement of the anchorage pins 27 and of the latch elements 28 at opposite ends of the crossbar with the rails B and C at opposite side walls of the storage chamber.

Each head 26 comprises a metal bar 40 located within a recess 41 in one of the wood strips and disposed in surface to surface relation with the central web 35 of the body portion 25. When both heads 26 are slidable as illustrated in FIGURE 3, then the bars 40 thereof are provided with spaced elongated slots 42 that receive the shanks of suitable bolts 43 fastened to the central web 35 of the beam. However, when one head 26 only is slidable as aforesaid, then the other head 26 is rigidly secured by any suitable means (not shown) to the central web 35 of the beam.

Preferably the spaced anchorage pins 27 are integral with and extend downwardly from the bases 50 of metal channels 51 located below and substantially parallel to the undersides of the heads 26. Each channel 51 carries one pair of spaced pins 27, and the spacing of said pins corresponds to the spacing of the holes 21 and 22 respectively in the horizontal flanges 19 and 20 respectively of the rails B and C. In the present instance, the channels 51 carrying the pins 27 are yieldably supported from the bars 40 of the heads 26 at opposite ends of the crossbar by means of relatively thick rubber blocks 60 that are between and are rigidly secured in surface to surface relation to the bars 40 and to the bases 50 of the channels 51 and that provide sufficient flexibility between the body portion 25 of the crossbar and the rails B and C to enable the body portion 25 of the anchored crossbar to yield horizontally within predetermined limits in a direction lengthwise of the storage chamber to absorb shocks and jars when the transport vehicle is stopped suddenly while in motion.

As an alternate construction, I may provide rubber blocks 70 between the vertical flanges 13¹ of longitudinally movable rails B¹ and the bases 71 of inwardly opening metal channels 72 upon the upright side walls 11 of the storage chamber. As shown in FIGURES 7 and 8, the bases 71 of the channels are disposed in surface to surface relation with and rigidly secured to the upright side walls 11 of the storage chamber. The rubber blocks 70 are disposed in surface to surface relation with and are rigidly secured to the bases 71 of the channels and to upright metal plates 73 that are disposed in surface to surface relation with and are rigidly secured to the vertical flanges 13¹ of the rails B¹.

In both constructions aforesaid, the desired flexibility for the purposes set forth is provided between the body portion 25 of each crossbar and the side walls 11 of the storage chamber. Also, both constructions include means providing positive stops for preventing the body portion 25 of each anchored crossbar from accidentally moving beyond predetermined limits lengthwise of the storage chamber. For example, in FIGURE 5 the metal bar 40 and rubber block 60 are centered in the upwardly opening metal channel 51, hence limited lost motion is provided between opposite sides 74 of the channel for said bar 40 and rubber block 60. In FIGURES 7 and 8, the metal plate 73 and rubber block 70 are centered in the metal channel 72, hence limited lost motion is provided between opposite sides 75 of the channel for said plate 73 and rubber block 70. Consequently, the engagement of the bar 40 with either side 74 of the channel 51, or the engagement of the metal plate 73 with either side 75 of the channel 72 will prevent the body portion 25 of each anchored crossbar from accidentally moving lengthwise of the storage chamber beyond a predetermined limit determined by the space or distance originally provided between the bar 40 and sides 74 or between the metal plate 73 and sides 75.

In FIGURES 9 and 10 I have shown another modification wherein the vertical flanges 13¹ of the longitudinally movable rails B¹ extend below the bases 71 and the sides 75 of the metal channels 72, and have their lower edges within and slidably supported by upwardly opening channel-shaped portions 76 of metal plates 77 having depending flanges 78 secured to the upright side walls 11 of the storage chamber and having horizontal portions 79 secured to the bases 71 and sides 75 of the metal channels 72. Hence the rails B¹ will be adequately supported in the event the rubber blocks 70 should rupture or break loose.

If desired, the shock absorbing structure illustrated in FIGURES 3 to 5 inclusive and the shock absorbing structure illustrated in FIGURES 7 and 8 respectively may be employed at the same time, or the shock absorbing structure illustrated in FIGURES 3 to 5 inclusive and the shock absorbing structure illustrated in FIGURES 9 and 10 respectively may be employed at the same time, or a crossbar devoid of the rubber blocks 60 may be employed with either the shock absorbing structure in FIGURES 7 and 8 or the shock absorbing structure in FIGURES 9 and 10. For example, when the rails B are rigidly secured to the upright side walls 11 of the storage chamber, as illustrated in FIGURES 1 to 5 inclusive, then rubber blocks such as 60 in the crossbar structure illustrated in FIGURES 3 to 5 inclusive could be employed. However, when the rails B¹ are movable longitudinally and are flexibly connected to the upright side walls 11 of the storage chamber, as illustrated in FIGURES 7 to 10 inclusive, then the rubber blocks such as 60 in the crossbar structure illustrated in FIGURES 3 to 5 inclusive could also be employed, or metal blocks (not shown) similar in configuration to the rubber blocks 60 could be used instead of and as substitutes for said rubber blocks 60 to provide rigid connections between the bases 50 of the channels 51 and the bars 40 of the crossbars.

The pivotally mounted latch elements 28 extend through slots 80 in the bars 40 of the heads 26 at opposite ends of the crossbar. As shown, each latch element 28 is substantially C-shaped in configuration and is provided at the outer edge thereof intermediate its ends with spaced integral lugs 81 and 82 respectively that are disposed upon opposite sides of the bar 40. The upper lugs 81 are engageable with the upper surfaces of the bars 40 and serve as pivots for the latch elements 28, while the lower lugs 82 are engageable with the lower surfaces of the bars 40 and serve as stops for the latch elements.

Each latch element 28 has at its lower end a hook-shaped portion 83 provided with a wedge-shaped or cam-shaped edge 84 that is engageable with the inner edge of either the horizontal flange 19 of an anchorage rail B or the horizontal flange 19¹ of a longitudinally movable anchorage rail B¹, and that is operable to cause the hook-shaped portion 83 to automatically clear either flange 19 of the rail B or the flange 19¹ of the rail B¹ when the pins 27 are lowered or moved downwardly into interlocking engagement with the holes 21 and 21¹ respectively in said horizontal flanges 19 and 19¹. The hook-shaped portion 83 is also provided with a substantially flat upper edge 85 that merges into the cam-shaped edge 84 and is engageable with the underside of said horizontal flanges 19 and 19¹ to hold the pins 27 against accidental displacement from the holes 21 and 21¹ after such pins have been interlocked therewith. Each latch element 28 has at its upper end a rounded finger piece 86 by which the latch element may be depressed by hand to cause the hook-shaped portion 83 thereof to be retracted and thereby be disengaged from the horizontal flanges 19 and 19¹ respectively of the rails B and B¹. In this connection, it will be noted that a coil spring 87 is located between and is terminally anchored in vertically spaced recesses 88 and 89 respectively in the latch element 28 and in the adjacent bar 40 for normally retaining the hook-shaped portion 83 in projected position.

In use, the desired number of crossbars D may be detachably anchored at longitudinally spaced points of the stationary and removable rails B and C respectively to brace or serve as abutments for crates, cartons and the like (not shown) containing merchandise of various kinds.

While the storage chamber of the transport vehicle is being loaded, the doorway rails C are removed, and if desired, the doorway post 17 may be removed or shifted out of the way. After the interior of the storage chamber at opposite ends thereof has been loaded and braced by crossbars, then the space in the storage chamber opposite the doorway 12 is loaded. The doorway bars C and posts 17 are then assembled in the doorway 12, as illustrated in FIGURE 1, so that the pins 27 of additional crossbars D may be engaged with selected holes 22 in the removable rails C to brace the load opposite the doorway. Such crossbars D may be easily anchored by moving them downwardly so that the pins 27 at opposite ends thereof will enter selected holes 21, 21¹ and 22 respectively in the rails B, B¹ and C. The latches 28 at opposite ends of the crossbars will automatically lock the crossbars in position when the pins 27 are interlocked with the selected holes in the rails B, B¹ and C.

While in transit, the rubber blocks 60 or 70, depending upon which is used, will provide sufficient flexibility between the anchored crossbars D and the upright side walls 11 of the storage chamber to permit the body portions 25 of such crossbars to yield horizontally in a direction lengthwise of the storage chamber to absorb the shocks and jars to which the cartons or crates are subjected in the event the transport vehicle is stopped suddenly while in motion. Should for any reason the rubber blocks 60 rupture or break loose, then the engagement of the metal bars 40 with one of the sides 74 of the metal channels 51 will effectively prevent the body portions 25 of the crossbars affected from accidentally moving beyond predetermined limits in a direction lengthwise of the storage chamber.

In FIGURES 11 to 14 inclusive, I have shown another modification wherein a horizontally extending inwardly opening channel-shaped supporting rail 90 for a horizontally extending longitudinally movable anchorage rail B¹ for crossbars such as D is disposed between adjacent uprights or posts 91 and 91a located at longitudinally spaced points of each upright side wall 11 of the storage chamber of the transport vehicle. Each supporting rail 90 is welded at one end to the post 91 and is spaced endwise from the other adjacent post 91a.

A pair of spaced upright metal plates 92 and 93 respectively are secured by bolts 94 and 95 respectively in surface to surface relation to the upright portion 96 of the supporting rail 90 and to the vertical flange 13¹ of the adjacent longitudinally movable anchorage rail B¹, and a rubber block 97 is between and secured in surface to surface relation to said plates 92 and 93.

An upright plate 98 is spaced longitudinally from the rubber block 97 and is welded to the vertical flange 13¹ of the adjacent longitudinally movable anchorage rail B¹. Preferably such upright plate 98 has outwardly offset upper and lower horizontally extending edge portions 99 and 100 respectively that are received in and slidably engage vertically opposed horizontally extending channel-shaped upper and lower edge portions 101 and 102 respectively of an upright plate 103 welded to the inwardly projecting upper and lower side flanges 104 of the channel-shaped supporting rail 90, so that the plates 98 and 103 collectively form means for guiding the longitudinally movable anchorage rail B¹ horizontally in a direction lengthwise of the storage chamber of the transport vehicle.

In the present instance, the plate 103 extends between and is welded at opposite ends thereof to the adjacent post 91a and to an upright bar 105 that is disposed substantially parallel to said post 91a, and is also welded to the inwardly projecting upper and lower said flanges 104 of the channel-shaped supporting rail 90, so that said bar 105 and adjacent post 91a constitute stops or abutments for the upright slidable plate 98 to limit horizontal movement of the longitudinally movable anchorage rail B¹ in a direction lengthwise of the storage chamber.

Thus, with this construction, the supporting rail 90 is rigidly secured to the post 91 and to the upright plate 103 which in turn is rigidly secured to the other adjacent post 91a. The rubber block 97 for yieldingly resisting movement of the longitudinally movable anchorage rail B¹ lengthwise of the storage chamber, and the upright plates 98 and 103 for guiding such movement of the anchorage rail B¹ are spaced apart longitudinally of the supporting bar 90. The stops or abutments 105 and 91a for limiting such longitudinal movement of the anchorage rail B¹ are located at opposite ends of and are rigid with the upright plate 103. Hence a very sturdy construction has been provided for supporting and yieldingly resisting movement of the anchorage rail B¹ lengthwise of the storage chamber.

The structure illustrated in FIGURES 11 to 14 inclusive is of course employed between adjacent posts 91 and 91a throughout the length of each upright side wall of the storage chamber of the transport vehicle, so that the cargo bracing structure will be uniform throughout the length of opposite upright side walls of the storage chamber, except at the door openings or doorways where removable anchorage rails, such as C, may be employed.

The crossbars D extend transversely of the storage chamber A of the transport vehicle and are detachably secured at opposite ends thereof to identical longitudinally movable anchorage rails B¹. Such crossbars D brace the cargo within the storage chamber A and are adapted to move with the anchorage rails B¹ in a direction lengthwise of the storage chamber when the rubber blocks 97 yieldingly resist such movement, to absorb the shocks and jars to which the cargo braced by said crossbars is subjected when it tends to move lengthwise of the storage chamber.

What I claim as my invention is:

1. In a transport vehicle having an upright side wall provided with two longitudinally spaced upright posts; two substantially parallel substantially horizontal rigid rails extending lengthwise of and substantially parallel to said side wall, one of said rails being entirely between said spaced posts, said one rail having one end thereof secured to one of said posts and having its other end spaced from the second of said posts, the second rail being upon the inner sides of and freely crossing said posts, said second rail being movable longitudinally relative to said posts in a horizontal plane parallel to said side wall and provided with means to which an anchoring member at one end of a transversely extending horizontal freight bracing crossbar may be detachably interlocked, an upright bar between said parallel rails and spaced from the second post aforesaid in parallel relation thereto, said upright bar being secured to the one rail aforesaid in spaced relation to said other end thereof, an upright plate between said parallel rails and extending lengthwise thereof, said upright plate extending between and terminally secured to said upright bar and said second post, said upright plate being also secured to and supporting said one rail and having vertically opposed horizontally extending channel-shaped portions at the upper and lower edges thereof extending lengthwise of said parallel rails and opening endwise toward and closed by said upright bar and said second post, a second upright plate extending lengthwise of and secured to said second rail and disposed between the latter and the upright plate aforesaid, said second upright plate having upper and lower horizontally extending edge portions respectively within and slidably engaging the opposed channel-shaped portions of said first mentioned upright plate to support and guide the longitudinal movement of said second rail, said opposed channel-shaped portions being operable to hold said second upright plate and said second rail against accidental vertical and lateral displacement, said second upright plate being spaced from and alternately engageable with said upright bar and said second post to limit longitudinal movement of said second rail, and shock absorbing means between and secured to said two parallel rails at a point between and in spaced relation to said one post and said upright bar to yieldingly resist longitudinal movement of said second rail.

2. In a transport vehicle having an upright side wall provided with two longitudinally spaced upright posts; a horizontally extending supporting rail disposed between said spaced posts and extending lengthwise of said side wall, said supporting rail having one end thereof rigidly secured to one of said spaced posts and having the other end thereof spaced from the second of said posts, a horizontally extending anchorage rail for a transversely extending horizontal freight bracing crossbar freely crossing said posts and disposed substantially parallel to said supporting rail, said anchorage rail being movable longitudinally in a horizontal plane parallel to said supporting rail and being provided with means to which anchoring means at one end of said crossbar may be detachably interlocked, an elastic shock resistant element between and connected to the parallel rails aforesaid to yieldingly resist longitudinal movement of said anchorage rail, a first upright plate extending lengthwise of and rigidly secured to said anchorage rail in spaced relation to said elastic element and having substantially parallel horizontally extending upper and lower edges, a second upright plate extending lengthwise of and rigidly secured to said supporting rail and being substantially parallel to said first upright plate, said second upright plate having vertically opposed substantially parallel horizontally extending channel-shaped portions receiving and providing guiding slideways for the upper and lower edges of said first upright plate during longitudinal movement of said anchorage rail, said opposed channel-shaped portions being operable to hold said first upright plate and said anchorage rail against accidental vertical and lateral displacement, said second upright plate extending beyond opposite ends of said first upright plate and extending beyond the other end aforesaid of said supporting rail and secured to the other of said spaced posts, and a rigid element secured to said second upright plate at the end thereof remote to the other of said spaced posts and disposed substantially parallel to said other of said posts, said rigid element and the other of said posts being spaced from and alternately engageable by said first upright plate to limit longitudinal movement of said anchorage rail.

3. In a transport vehicle having an upright side wall provided with two longitudinally spaced upright posts; a horizontally extending supporting rail disposed between said spaced posts and extending lengthwise of said side wall, said supporting rail having one end thereof rigidly secured to one of said spaced posts and having the other end thereof spaced from the second of said posts, a horizontally extending anchorage rail for a transversely extending horizontal freight bracing crossbar freely crossing said posts and disposed substantially parallel to said supporting rail, said anchorage rail being movable longitudinally in a horizontal plane parallel to said supporting rail and being provided with means to which anchoring means at one end of said crossbar may be detachably interlocked, an elastic shock resistant element between and connected to the parallel rails aforesaid to yieldingly resist longitudinal movement of said anchorage rail, two separate substantially parallel rigid elements between and rigidly secured respectively to said parallel rails and having portions disposed one within the other for holding said anchorage rail against both vertical and lateral movements relative to said upright side wall while permitting and guiding longitudinal movement of said anchorage rail, one of said two rigid elements extending beyond the other end aforesaid of said supporting rail and secured to the second of said posts, and a third rigid element secured to said one rigid element at a point remote to the second of said spaced posts and disposed substantially parallel to said second post, the other of said two rigid elements being between, spaced from, and alternately engageable with said third rigid element and said second post to limit longitudinal movement of said anchorage rail.

4. The structure defined in claim 2, wherein the elastic shock resistant element is an elongated block of resilient material extending longitudinally of said parallel rails, upright metal plates are permanently bonded in surface-to-surface relation to opposite longitudinally extending faces of said block, and headed fasteners secure said plates respectively to said parallel rails.

5. The structure defined in claim 2, wherein said rigid element is an upright bar, said upright bar closes one end of each of said vertically opposed channel-shaped portions, and said other post closes the opposite end of each of said vertically opposed channel-shaped portions.

References Cited in the file of this patent
UNITED STATES PATENTS 2,868,368   Beach ------------------ Jan. 13, 1959